United States Patent
Granata et al.

(10) Patent No.: US 7,045,206 B1
(45) Date of Patent: May 16, 2006

(54) MOLDED PANELS HAVING A SOFT PAD ARMREST

(75) Inventors: Giancarlo Granata, Sterling Heights, MI (US); Kevin Allen Kieltyka, Rochester, MI (US); Srinivas (Vasu) Kotha, Sterling Heights, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 954 days.

(21) Appl. No.: 09/612,869

(22) Filed: Jul. 10, 2000

(51) Int. Cl.
*B32B 5/14* (2006.01)

(52) U.S. Cl. .............. 428/308.4; 428/319.3; 428/319.7; 428/315.5; 428/315.7; 428/68; 428/77; 428/306.6; 428/316.6; 296/146.7; 296/153; 296/39.1; 297/411.46

(58) Field of Classification Search ............ 428/308.4, 428/305.5, 315.5, 315.7, 217, 218
See application file for complete search history.

(56) References Cited

U.S. PATENT DOCUMENTS

| | | | | |
|---|---|---|---|---|
| 3,593,848 A | * | 7/1971 | Landau | 428/98 |
| 4,270,228 A | * | 6/1981 | Gaiser | 2/158 |
| 4,414,458 A | * | 11/1983 | Nomura | 219/69.12 |
| 4,740,417 A | | 4/1988 | Tornero | |
| 4,850,579 A | * | 7/1989 | Fisher | 269/21 |
| 4,873,041 A | | 10/1989 | Masui et al. | |
| 4,873,045 A | | 10/1989 | Fujita et al. | |
| 5,180,617 A | | 1/1993 | Takeuchi et al. | |
| 5,274,846 A | | 1/1994 | Kolsky | |
| 5,336,463 A | | 8/1994 | Hara et al. | |
| 5,352,397 A | | 10/1994 | Hara et al. | |
| 5,403,645 A | * | 4/1995 | Stein et al. | 428/138 |
| 5,544,912 A | * | 8/1996 | Sommer | 280/728.3 |
| 5,626,382 A | | 5/1997 | Johnson et al. | |
| 5,655,367 A | * | 8/1997 | Peube et al. | 60/324 |
| 5,935,364 A | * | 8/1999 | Groendal et al. | 156/216 |
| 6,080,493 A | * | 6/2000 | Kent | 428/613 |

FOREIGN PATENT DOCUMENTS

GB     1244487 A   *   9/1971

* cited by examiner

*Primary Examiner*—Hai Vo
(74) *Attorney, Agent, or Firm*—Brinks Hofer Gilson & Lione

(57) ABSTRACT

A method for forming a molded panel comprising a rigid substrate, a cover material, and a localized composite pad. The method comprises providing a molding tool having a first mold and a second mold, the first mold having a cavity; inserting a cover material between the first mold and the second mold; placing a composite pad comprising an impregnable layer and a non-impregnable layer in the cavity of the first mold, wherein the non-impregnable layer is facing the second mold and the impregnable layer is abutting the first mold; introducing resin into the molding tool; and solidifying the resin to form the molded panel whereby the non-impregnable layer of the composite pad is located adjacent the cover material.

25 Claims, 2 Drawing Sheets

MOLDED PANELS HAVING A SOFT PAD ARMREST

TECHNICAL FIELD

The present invention relates to molded panels comprising a rigid substrate, a cover layer, and a localized composite pad for use in automotive interiors, and to a method for making the same.

BACKGROUND ART

Automotive interior molded panel components such as automotive door trims, rear side trims, rear parcel shelves, etc. are typically provided with a layered structure comprising a core layer, or substrate, having a certain rigidity and a skin, or cover, layer having an ornamental or attractive surface texture which is bonded to the surface of the core layer. In order to minimize the time and labor required to manufacture these molded panels interior components, resort has been made to integrally assembling the rigid substrate and the cover layer of these molded panels according to a one-step forming process wherein the cover layer is shaped and secured to the rigid substrate during the forming of the rigid substrate. This is typically done by inserting a cover-skin material between a first and second mold of a molding tool; introducing resin into the molding tool; and solidifying the resin to form a molded rigid substrate with the cover material secured thereto. The resin can be introduced into the molding tool using two suitable molding processes, injection molding and low pressure molding (LPM).

It is often desirable for these automotive molded panels to have a soft-touch to the vehicle occupant. Up until now, there has not been a suitable one-step method for forming molded panels having a soft touch.

Accordingly, it would be desirable to provide a one-step method for making a soft-touch molded panel that can be done inexpensively and without requiring a substantial amount of time and labor. It would also be desirable to manufacture a soft touch molded panel, i.e., via a low pressure molding or injection molding process method.

DISCLOSURE OF INVENTION

The present invention relates to a method for forming a molded panel comprising a rigid substrate, a cover layer, and a localized composite pad. The method comprises providing a molding tool having a first mold and a second mold, the first mold having a cavity; inserting a cover layer between the first mold and the second mold; placing a composite pad comprising an impregnable layer and a non-impregnable layer in the cavity of the first mold, wherein the non-impregnable layer is facing the second mold and the impregnable layer is abutting the first mold; introducing resin into the molding tool; and solidifying the resin to form the molded panel whereby the non-impregnable layer of the composite pad is located adjacent the cover layer.

Use of the composite pad allows the molded panel to be manufactured in a one-step method. During the introduction of the resin into the molding tool and during the solidifying of the resin to form the molded panel, the resin is allowed to flow through the impregnable layer of the composite pad. If the pad was formed of only non-impregnable elastomeric material, the resin would flow over the non-impregnable pad and between the pad and the cover layer. Also, the resin could possibly flow around the non-impregnable pad or cause the pad to be moved from its place. To overcome this problem, prior art processes that use a pad formed only of non-impregnable material employ the additional steps of bonding the elastomeric pads to the cover layer, and pre-forming the cover layer to the molded shape, prior to introducing the resin.

Another disadvantage to having the resin flow around the pad is that the structural integrity of the molded panel is compromised since the substrate does not extend below the pad. In the present invention, the molded panel has a portion that extends through the impregnable layer.

The above objects and other objects, features, and advantages of the present invention are readily apparent from the following detailed description of the best modes for carrying out the invention when taken in connection with the accompanying drawings.

BEST MODE FOR CARRYING OUT THE INVENTION

Figure 1:
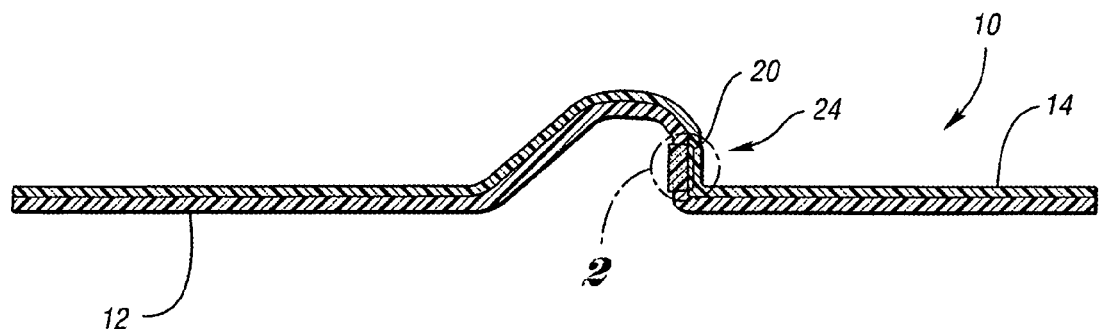
FIG. 1 is a side view of a molded panel in accordance with the present invention.

FIG. 1 illustrates a molded door panel 10 of the present invention. The door panel 10 comprises a rigid substrate 12, a cover layer 14, and a composite pad 20 there between. The molded panel 10 has a hardness of about 45–70 Shore A, more preferably about 50–65 Shore A, and most preferably about 55–62 Shore A, when measured according to ASTM No. D2240 along a line that intersects the composite pad 20. The door panel 10 includes an armrest portion 24 about halfway between the top and bottom edges of the door panel 10. The armrest portion 24 is formed as a rounded horizontal shelf.

The rigid substrate 12 is preferably between 1.0 and 4.5 mm in thickness, more preferably between about 2 and about 3.25 mm in thickness, and most preferably between about 2.5 to about 2.8 mm in thickness. The molded rigid substrate 12 can be made of any suitable thermoplastic or thermoset resin. Suitable resins include, but are not limited to, polypropylene, polyethylene, polyvinylchloride, ABS, and Dylark®.

The cover layer 14 secured to the rigid substrate 12 and the composite pad 20 preferably has a thickness between about 0.3 to about 4 mm, more preferably between about 0.4 and about 2.5 mm, and most preferably between about 1 to about 2.5 mm. The cover material may be a suitable type of cover material. Preferably, the cover material comprises a skin layer consisting of a cloth, non-woven fabric, vinyl, TPO, or the like, and a laminated cushioning layer, such as a layer of polyurethane or olefin foam, lined to the reverse surface, or underside of the skin layer.

Figure 2:
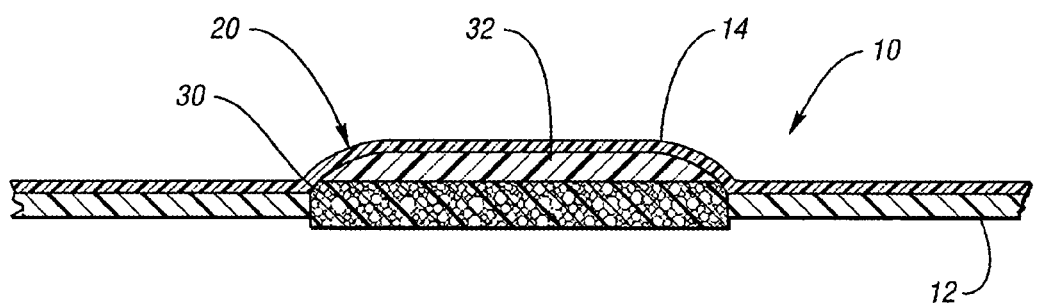
FIG. 2 is a sectional view of the molded panel of FIG. 1 taken along line 2—2.

The composite pad 20, as best shown in FIG. 2, comprises an impregnable layer 30 and a non-impregnable layer 32. The layers 30 and 32 are bonded to each other, preferably by a suitable adhesive, such as the spray adhesives made by 3M. The layers 30 and 32 may also be bonded together by flame lamination.

The composite pad 20 can be of any suitable thickness depending upon the design and structure of the molded door panel 10. Preferably, the composite pad 20 has a thickness from about 5 and 30 mm, more preferably from about 7 and 15 mm, and most preferably from about 8 and 13 mm. The composite pad 20 preferably has a hardness of about 35–75 Shore A, more preferably of about 45–60 Shore A, and most preferably about 50–55 Shore A, when measured according to ASTM No. D2240.

As with the thickness of the composite pad 20, the thickness of each layer 30 and 32 may vary depending upon the design and structure of the molded door panel 10. Preferably, the impregnable layer 30 has a thickness of at least the thickness of the rigid substrate 12, and more preferably has a thickness that is greater than the thickness of substrate 12. Preferably, the impregnable layer has a thickness of from about 1 to about 25 mm, more preferable about 3 to about 15 mm and most preferably from about 5 and 10 mm. The non-impregnable layer 32 preferably has a thickness of from about 1 and 25 mm, more preferably from about 3 and 8 mm, and most preferably from about 5 and 10 mm.

The impregnable layer 30 may be a reticulated pad or alternately, the impregnable layer may be a porous pad. The impregnable layer 30 can be made of any suitable material, and preferably is made of resinous material. Suitable resinous materials include, but are not limited to, polypropylene, polyethylene, and polyurethane. The impregnable layer preferably has a pore density of between about 1 to about 100 pores per inch, and more preferably between about 10 to about 60 pore per inch.

The impregnable layer 30 preferably has an CLD (compression load deflection) of between about 0.35 to 0.52 psi. The impregnable layer 30 preferably has a foam density of between about 1.5 to about 2.5 pounds per cubic foot (pcf), and more preferably between about 1.75 to about 2.25 pounds per cubic foot (pcf).

The non-impregnable layer 32 may be made of any suitable elastomeric foam-type material. The foam type material may be a non-reticulated, opened or closed-cell material. The non-impregnable layer is impermeable to liquified resin. Suitable materials include, but are not limited to, polypropylene, polyethylene, and polyurethane. The non-impregnable layer 32 is made of such a material that it preferably has an indentation load of from about ~5 to about 100 pounds, more preferably from about 7.5 to about 80 pounds, and most preferably from about 10 to about 60 pounds. The material used to form the layer of non-impregnable material preferably has a foam density of from about 1 to about 6 pcf, and more preferably from about 1.25 to about 4 pcf, and most preferably from about 1.6 to about 2.5 pcf.

Figure 3:
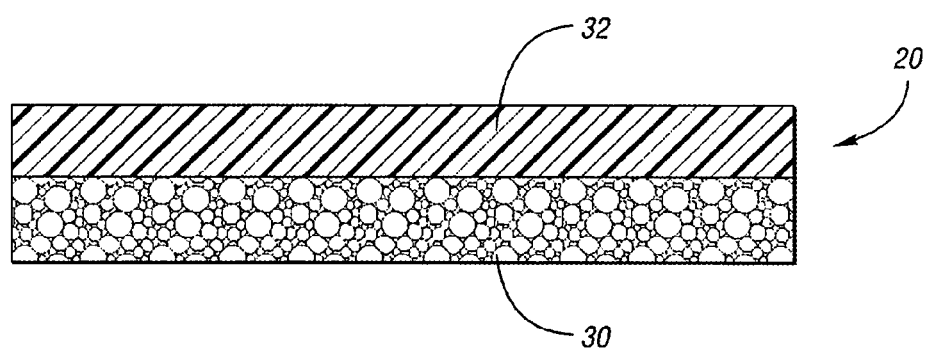
FIG. 3 is a side view of a component of the molded panel of FIG. 1.
Figure 4A:
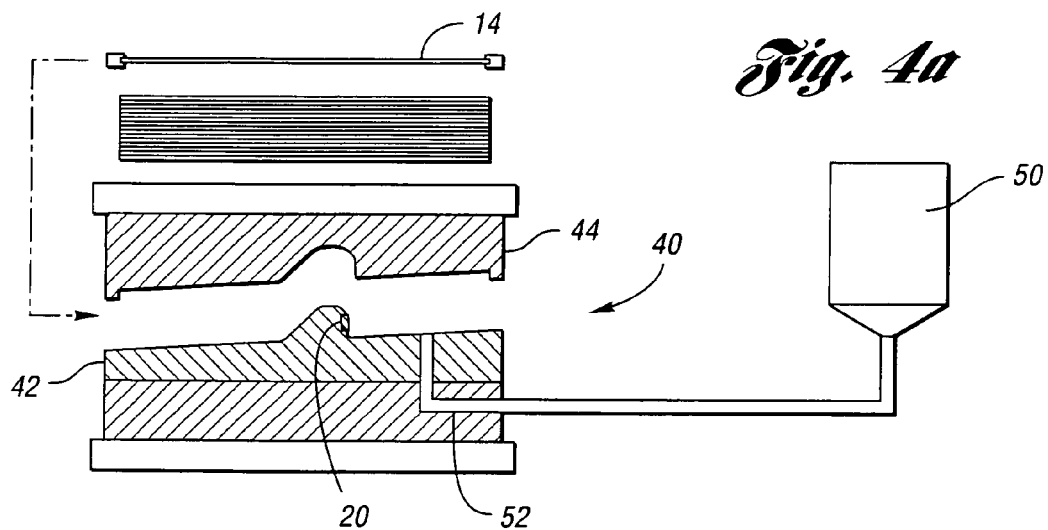
FIGS. 4a–4d illustrate the general method for making the molded panels of the present invention.
Figure 4B:
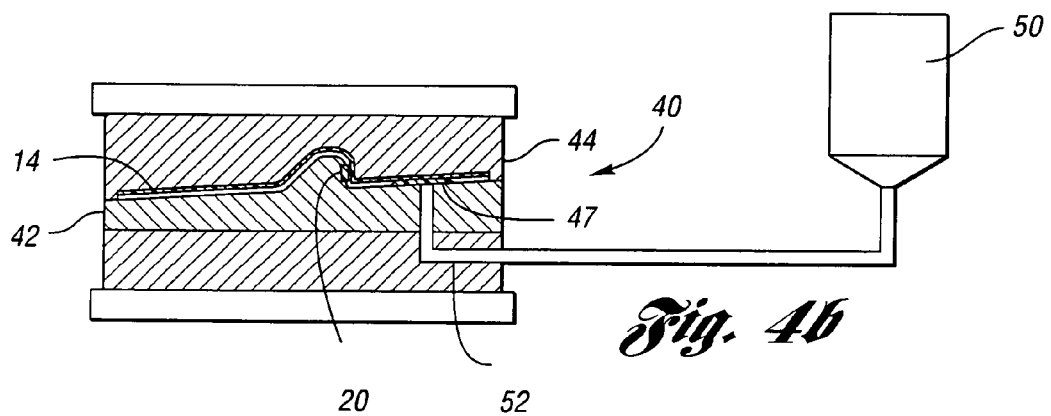
Figure 4C:
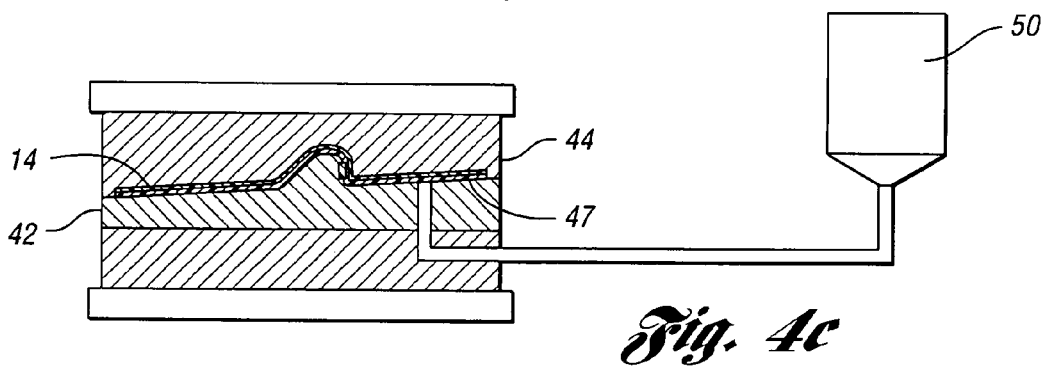
Figure 4D:
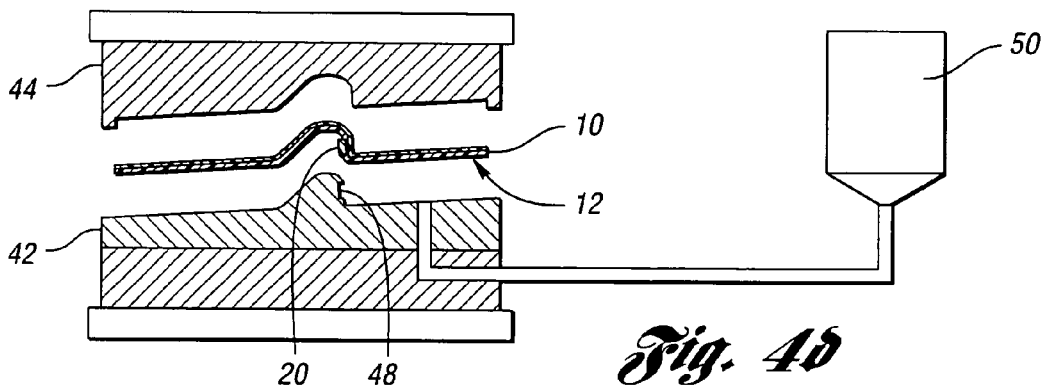

The molded panel 10 is formed via a one-step molding process. The general process for forming the molded panel 10 of the present invention is illustrated in FIG. 3. A molding tool 40 comprising a first mold 42 and a second mold 44 is provided. The first mold 42 and the second mold 44 include surfaces which cooperate to define the general shape of the molded panel 10. The first mold 42 includes a cavity 48 for receipt of the composite pad 20 during the molding of the molded panel 10. The composite pad 20, when received in the cavity 48 of the first mold 42, is positioned such that the non-impregnable layer 32 is facing the second mold 44 with the impregnable layer 30 facing and contacting the first mold 42. This enables the impregnable layer 30 to be spaced from the cover material 14 of the molded panel 10 when the molded panel is formed in the non-impregnable layer 32 to be contacting the cover material 14 when the molded panel 10 is formed. The cavity 48 has a depth that is less than the thickness of the impregnable layer 30 so that, when the pad 20 is received in the cavity 48, a portion of the impregnable layer 30 of the pad extends out of the cavity 48 to enable resin to flow into the impregnable layer 30 in the cavity, as will be explained in more detail below.

The cover material 14 is placed between the first and second molds 42 and 44. The composite pad 20 is placed in the cavity 48 of the first mold 42. One or both of the first and second molds 42 and 44 are moved towards the other mold to close the molding tool 40. As will be explained in more detail below, depending upon the particular molding process, resin 47 is introduced into the molding tool either just before or just after the molding tool is closed. The resin is a resin that is used to form the rigid substrate 12. The resin is housed in a hopper or extruder 50 and is delivered into the molding tool 40 through a barrel 52 in the first mold 42. The temperature of the barrel during the molding process, and thus, during delivery of the resin to the tool 40, is between about 350–550° F. The temperature of the molds 42 and 44 during the molding process is between 50–90° F.

The resin, once in the molding tool 40, is then solidified to form the rigid substrate 12 of the molded panel 10. As the rigid substrate 12 is formed, the cover material is secured to the rigid substrate and the non-impregnable layer 32 of the composite pad 20 by the formation of a chemical or mechanical bond or both, between the cover material 14 and the rigid substrate 12 and the composite pad 20. During this process, the resin is allowed to flow into the cavity 48 from at least one of the sides of the impregnable layer 30 of the pad 20 through at least some of the pores of the impregnable layer 30 and solidify throughout the pores of the impregnable layer. No resin extends into the non-impregnable layer 32. Thus, the substrate 12 has portions that (i) extend throughout the pores of the impregnable layer 30, and (ii) adjacent to the sides of the impregnable layer.

The resin for forming the rigid substrate 12 can be introduced into the molding tool 40 by either low pressure molding or injection molding. If the resin is introduced according to the low pressure molding process, the resin is introduced into the molding tool 40 under a pressure of between about 500 to about 1000 psi, more preferably between about 600 to about 900 psi, and most preferably between about 700 to about 800 psi. The resin preferably has a melt flow rate of about 40 to about 100. The resin is introduced into the molding tool 40 when the molds 42 and 44 are spaced about ¾ of an inch apart from each other. The tool 40 is then completely closed to allow the resin to solidify.

If the resin is introduced according to the injection molding process, the resin is introduced into the molding tool 40 under a pressure of between about 1100 to about 1600 psi, more preferably between about 1200 to about 1500 psi, and most preferably between about 1200 to about 1400 psi. The resin preferably has a melt flow rate of about 10 to about 100. The resin is introduced into the molding tool 40 when the molds 42 and 44 are completely closed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An automobile interior molded panel comprising:
a rigid substrate having a first substrate surface and a second substrate surface generally opposed to the first substrate surface;
a composite pad supported by the substrate, the pad comprising a non-impregnable layer of an elastomeric material and an impregnable layer adjacent the non-impregnable layer, the impregnable layer including a reticulated foam resin material such that at least a portion of the substrate extends into the impregnable layer and extends adjacent to sides of the impregnable layer, the non-impregnable layer being disposed adjacent the first substrate surface and the non-impregnable layer having a first non-impregnable layer surface facing away from the impregnable layer and the substrate, and a second non-impregnable layer surface generally opposite the first non-impregnable layer surface, the first substrate surface and the first non-impregnable layer surface facing in the same general direction; and
a cover skin disposed over and directly bonded to the first substrate surface and the first non-impregnable layer surface of the pad.

2. The panel of claim 1 the reticulated material having an amount of pores per inch of about 1 to 100 and a foam density of about 1.5 to 2.5 pcf.

3. The panel of claim 2 wherein the non-impregnable layer is made of an elastomeric foam material.

4. The panel of claim 3 wherein at least a portion of the rigid substrate is present throughout the impregnable layer.

5. The panel of claim 4 wherein the composite pad has a Shore A hardness of about 35–70 when measured according to ASTM No. D2240.

6. The panel of claim 5 wherein the molded panel has a Shore A hardness of about 45–70 when measured according to ASTM No. D2240 while measuring along a line that intersects the composite pad.

7. The panel of claim 1 wherein the non-impregnable layer and the impregnable layer of the composite pad are connected.

8. The panel of claim 1 wherein the pad extends along only a portion of the substrate.

9. The panel of claim 1 wherein the cover skin is a polymeric layer.

10. The panel of claim 1 wherein the composite pad is preformed.

11. An automobile interior molded panel comprising:
a rigid substrate;
a preformed composite pad including a non-impregnable layer and an impregnable layer;
a cover skin disposed over and bonded to the substrate and the pad, wherein the cover skin is directly bonded to at least a portion of the non-impregnable layer of the pad and a portion of the substrate;
wherein the impregnable layer is made of reticulated resin material having an amount of pores per inch of about 1 to 100 and a foam density of about 1.5 to 2.5 pcf;
wherein the non-impregnable layer is made of elastomeric foam material;
wherein at least a portion of the rigid substate is present substantially throughout the impregnable layer; and
wherein at least a portion of the rigid substrate is adjacent to sides of the impregnable layer.

12. An automobile interior molded panel comprising:
a rigid substrate;
a composite pad comprising a non-impregnable layer of an elastomeric material and an impregnable layer including a reticulated foam resin material defining a network within the reticulated material;
a cover skin disposed over and directly bonded to at least a portion of the substrate and at least a portion of the non-impregnable layer of the pad;
wherein at least a portion of the rigid substrate is present substantially throughout the network of the impregnable layer.

13. The panel of claim 12, the reticulated material having an amount of pores per inch of about 1 to 100 and a foam density of about 1.5 to 2.5 pcf.

14. The panel of claim 12 wherein the non-impregnable layer is made of an elastomeric foam material.

15. The panel of claim 12, the reticulated material having an amount of pores per inch of about 1 to 100 and a foam density of about 1.5 to 2.5 pcf and the non-impregnable layer including an elastomeric foam material.

16. The panel of claim 15 wherein the composite pad has a Shore A hardness of about 35–70 when measured according to ASTM No. D2240.

17. The panel of claim 15 wherein the molded panel has a Shore A hardness of about 45–70 when measured according to ASTM NO. D2240 while measuring along a line that intersects the composite pad.

18. The panel of claim 12, wherein the impregnable layer comprises a porous material and the non-impregnable layer comprises an elastomeric foam material.

19. An automobile interior molded panel comprising:
a rigid substrate;
a composite pad comprising a non-impregnable layer of an elastomeric material and an impregnable layer including a reticulated foam resin material defining a network within the reticulated material; and
a cover skin disposed over and directly bonded to at least a portion of the substrate and at least a portion of the non-impregnable layer of the pad; wherein at least a portion of the rigid substrate is adjacent to sides of the impregnable layer and wherein at least a portion of the rigid substrate is present substantially throughout the network of the impregnable layer.

20. The panel of claim 19, the reticulated material having an amount of pores per inch of 1 to 100 and a foam density of about 1.5 to 2.5 pcf.

21. The panel of claim 20 wherein the non-impregnable layer is made of an elastomeric foam material.

22. The panel of claim 21 wherein the composite pad has a Shore A hardness of about 35–70 when measured according to ASTM No. D2240.

23. The panel of claim 22 wherein the molded panel has a Shore A hardness of about 45–70 when measured according to ASTM No. D2240 while measuring along a line that intersects the composite pad.

24. The panel of claim 19, wherein the non-impregnable layer comprises an elastomeric foam material.

25. The panel of claim 19, wherein the impregnable layer comprises a porous material the non-impregnable layer comprises an elastomeric foam-material.

* * * * *

UNITED STATES PATENT AND TRADEMARK OFFICE
CERTIFICATE OF CORRECTION

| | | |
|---|---|---|
| PATENT NO. | : 7,045,206 B1 | Page 1 of 1 |
| APPLICATION NO. | : 09/612869 | |
| DATED | : May 16, 2006 | |
| INVENTOR(S) | : Giancarlo Granata et al. | |

It is certified that error appears in the above-identified patent and that said Letters Patent is hereby corrected as shown below:

Column 5, in claim 2, line 1, immediately after "panel of claim 1" insert --,-- (comma).

Signed and Sealed this

Nineteenth Day of December, 2006

JON W. DUDAS
*Director of the United States Patent and Trademark Office*